March 2, 1937. J. BURNHAM 2,072,541
RUBBERIZED GLOVE
Filed Aug. 30, 1935
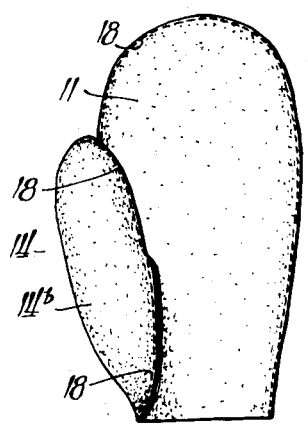
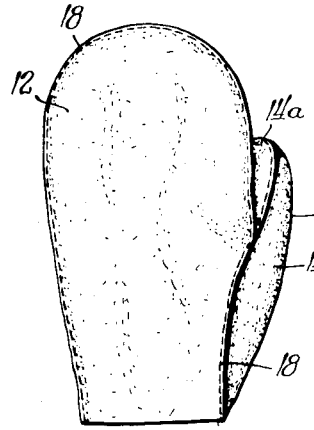
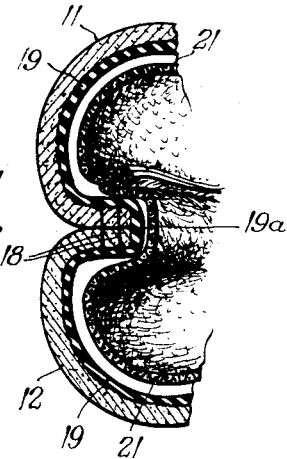
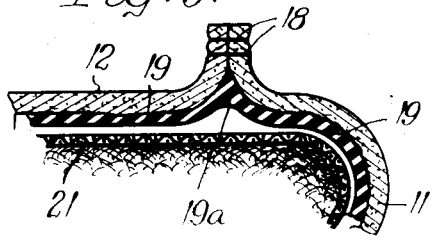
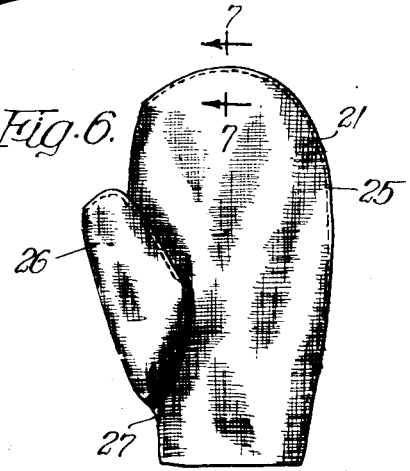
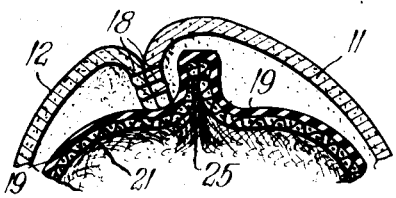
Inventor:
John Burnham
By Brown, Jackson, Boettcher & Dienner
Attys.

Patented Mar. 2, 1937

2,072,541

UNITED STATES PATENT OFFICE 2,072,541

RUBBERIZED GLOVE

John Burnham, Michigan City, Ind., assignor to Frederic H. Burnham Company, Michigan City, Ind., a corporation of Indiana Application August 30, 1935, Serial No. 38,511

4 Claims. (Cl. 2—164)

The present invention relates to improvements in rubberized gloves and mittens and in the method of making the same. The general aim in rubberizing gloves is to make the gloves waterproof, and also to protect the wearer against electrical shocks, and, in some instances to protect the wearer against the action of chemicals. This feature is most commonly adopted in workmen's gloves, although it is to be understood that the present invention is also applicable to driving gloves, shooting gloves, etc.

One of the principal objects of the present invention is to provide improved rubberized gloves wherein the rubber is embodied in the glove in a very pliable, non-vulcanized state. Prior methods of rubberizing gloves based on the operation of vulcanizing the rubber in the glove are objectionable for numerous reasons. For example, where the wearing or working surfaces of the glove consist of leather, the vulcanizing temperatures have a deleterious influence on the leather, tending to dry or harden the same, depending upon the degree and duration of the vulcanizing temperatures. Furthermore, when gloves are rubberized by vulcanization the rubber does not possess the life, pliability and durability that it does in my improved process of rubberizing gloves. Moreover, the vulcanizing operation represents an item of additional cost in the manufacture of the gloves.

In my invention, the rubber is applied in the form of a latex compound of a very fluid consistency, represented, for example, by a consistency which can be applied with a brush, or possibly even sprayed onto the material of the gloves. This latex compound has marked adhesive properties which insure effective adhesion of the rubber film with the material of the glove, without the necessity of a vulcanizing operation.

Other objects, advantages and features of the invention will appear from the following detailed description of three preferred embodiments of my invention, together with the improved method of making the same.

In the accompanying drawing:—

Figures 1 and 2 are front and back elevational views of an inseam type of mitten or glove turned wrong-side-out for the operation of stitching the front, back and thumb together, the rubber latex being applied at this time to the inner or rough surface of the leather, in one embodiment of my invention.

Figure 3 is a perspective view of the finished mitten turned right-side-out, the mitten including a fabric lining and a wristband or gauntlet cuff, as desired.

Figure 4 is a fragmentary sectional view taken approximately on the plane of the line 4—4 of Figure 3, illustrating in very enlarged scale the relation between the leather, rubber film and fabric lining, particularly at one of the outer seams of the glove.

Figure 5 is a view similar to Figure 4, showing the invention embodied in a glove in which the back and front are joined by an outseam.

Figure 6 is an elevational view of a fabric lining, in condition for the application of a film of rubber latex over the outer surface of such lining, in accordance with another embodiment of my invention; and Figure 7 is an enlarged sectional view of the finished glove constructed according to this latter embodiment.

In the following description and in the appended claims I shall use the term "glove" in the all-inclusive sense of any hand covering, whether of the mitten form having a single separate sheath solely for the thumb, or of the glove form having separate sheaths for each of the fingers, it being understood that my invention is equally applicable to both.

Referring first to that embodiment of my invention wherein the rubber latex is applied directly to the leather of the glove, the leather front of the glove is indicated at 11 and the leather back at 12. One half of the leather thumb sheath 14 consists of an extension 14a of the palm or front portion 11, and the other half 14b consists of a separate piece of leather stitched to the front 11 and to the back 12. Figures 1 and 2 show these parts in the process of being stitched together, the lines of stitching being indicated at 18. Assuming the glove to be an inseam type of glove, the leather parts are at this time turned wrong-side-out, viz., the unfinished rough or flesh side of the leather is now outermost. After the completion of the stitching operations, the rubber latex is applied directly to this rough surface of the leather parts. The latex compound which I preferably employ for securing the aforementioned advantages comprises latex, sulphur, zinc oxide and organic accelerator, the ingredients and their proportions being such that the compound is highly adhesive and is also completely self-drying. The compound is preferably in a relatively diluted or fluid condition, so that it is capable of effecting complete and intimate adhesion with the rough, shaggy surface of the leather, and of forming a complete film over and around the lines of stitching and over the seam lines.

The application of the latex may be effected by brushing or painting it on the leather with an appropriate brush; by spraying it thereon through a suitable spray gun; or by dipping the stitched leather parts into the latex for coating only the exposed rough surfaces of the leather. By reason of the adhesiveness of this compound and its self-drying property there is no need of any vulcanizing operation to effect the desired adhesion between the rubber film and the leather, or to secure adequate drying of the film. The drying can be effected at ordinary temperatures, or it can be accelerated, if desired, by higher temperatures. If successive coats of latex are desired they are applied after the preceding coat is partially or completely dry. After the desired film has been applied and dried, or substantially dried, the exposed surface of the film is dusted with ground corn meal. This removes all tackiness from the surface of the rubber film. Other agents serving the same purpose as this ground corn meal may, of course, be used, but I find the corn meal to be preferable.

Thereupon, the treated leather parts 11, 12, and 14 are turned right-side-out to expose the finished surface or grain side of the leather on the outer side of the glove, as illustrated in Figure 3. The rubber film adhering to the inner, rough surface of the leather is indicated at 19 in Figure 4. A suitable lining 21, preferably of fabric, such as knitted, napped jersey fabric, is now inserted into the glove. The nap side of this lining is preferably innermost, next to the hand of the wearer, and the finished side of said lining is presented to the rubber film 19. Any desired elastic wristband 22, gauntlet cuff, or the like, can be stitched to the lower ends of the treated leather parts 11, 12, and 14. The lining 21 is secured by a single line of stitching either at the lower end of the wristband 22 or at the lower end of the treated leather parts 11, 12, and 14. The attachment of the lining solely at one or the other of these points assures that no stitching will create holes in the rubber film 19 in the main working portion of the glove.

Referring to Figure 4, it will be seen that the foregoing method of rubberizing the glove results in a continuous rubber film extending completely across each seam line, as indicated at 19a. Furthermore, this rubber film, in being applied after the main stitching operation, results in the film adhering around and over the stitching thread 18, whereby the stitching holes in the leather are sealed against the entrance of moisture and whereby any thread subsequently breaking in the seam has its ends anchored in the rubber film so that there is a minimum likelihood of the seam opening at this point.

Substantially the same rubberizing operation described above may be followed in the case of out-seam gloves, represented, for example, by gloves in which the back part 12 is joined to the front part 11 by a stitched seam exposed to the outer back surface of the glove. Such a form of glove is illustrated in Figure 5. The rubber latex is applied to the rough, unfinished surface of the leather, after the stitching operation, with the glove turned inside out. With the glove turned right-side-out, as shown in Figure 5, it will be seen that the rubber film completely spans the seam at 19a, so that there is no opportunity for moisture to enter the glove at the seam line. That is to say, the rubber film 19 is a single unitary film throughout the entire glove, with no break in the continuity thereof at the seam lines.

In Figures 6 and 7 I have illustrated another embodiment of my invention wherein the rubber latex is applied to the outer surface of the lining 21. This lining is preferably a fabric lining, such as canton flannel, the outer surface to which the latex is applied being the finished surface, opposite to the nap side of the fabric. When the lining is for a mitten, as shown in Figure 6, the front and back thereof preferably consist of a single piece of fabric folded over and sewed together as by the line of stitching 25, the thumb sheath also consisting of a single piece of fabric 26 folded over and sewed to the main body portion of the mitten as by the line of stitching 27. In the case of a lining for a glove, the front and back may consist of separate pieces sewed together to form the individual finger sheaths. After the lining has been sewed together the rubber latex is applied in much the same manner as described above. That is to say, it can be applied by brushing, spraying, or by dipping the lining. Successive applications of the latex may be made if a thicker film of rubber is desired.

The consistency of this latex is such that it effects a superficial impregnation of the finished outer surface of the lining, thereby securing effective adhesion therewith, but it does not impregnate the entire lining and hence does not penetrate through to the nap side of the fabric. Substantially upon the completion of the drying of this latex film, the surface thereof may be dusted, if desired, with corn meal or some similar material serving to remove tackiness from the surface of the film. The lining is then inserted in the glove and is secured thereto, preferably by a stitching operation near the lower end of the lining, where the stitching will not perforate the rubber film in the work portion of the glove. Figure 7 shows the lining inserted in the glove. The film is completely impervious to moisture; at the same time, it is extremely pliable, so that it does not tend to stiffen the lining. By reason of the fact that the latex is applied to the lining after the completion of the stitching operations, the rubber film completely spans each line of stitching so that there is no break in the continuity of the film at these points. The film also anchors the stitching thread so that the stitching cannot pull out in the event of a break in the thread. Furthermore, the film prevents raveling of the edges of the fabric lining.

While I have illustrated and described what I regard to be the preferred embodiments of my invention, nevertheless it will be understood that such are merely exemplary and that numerous modifications and rearrangements may be made therein without departing from the essence of the invention. For example, instead of making the outer wear-resisting portion of the glove of leather it might be made of a relatively heavy fabric, typically represented by so-called "over-coating" material. In such construction, the latex film would preferably be applied directly to the inner surfaces of this over-coating material, in the manner illustrated and described in connection with Figures 1 to 5, inclusive, although the latex film could be applied to a lining adapted to be inserted in such a glove, if desired. As illustrative of another contemplated modification, the lining might be composed of a thin, pliable leather, with the latex film applied over the outer surface of such lining. Furthermore, in any of the above-mentioned embodiments, the latex film could be applied to both the inner surface of the wear-resisting portion of the glove and to the outer surface of the lining. In each of the aforementioned embodiments, the lining is preferably not cemented or adhesively united to the leather or outer wearing material of the glove, but is free and movable therein.

I claim:—

1. A work glove of the class described comprising an outer leather ply with the unfinished rough flesh side of the leather on the inner side of the glove and the finished grain side of the leather on the outer side and forming the outer surface of the glove, said outer leather ply having stitched seams, and a rubber latex layer internally of said outer ply and adhesively united to the inner unfinished rough flesh side of the leather, said rubber latex layer extending as a unitary seal across the stitched seams of said outer leather ply and covering both faces of the stitched seams and the stitching at said seams being anchored in said inner rubber latex layer whereby the seams and stitching holes in the outer leather ply are completely covered and sealed against the entrance of moisture and the stitching is held internally of the leather ply against opening along said seams in the event of breaking of said stitching.

2. A work glove of the class described comprising an outer leather ply with the unfinished rough flesh side of the leather on the inner side of the glove and the finished grain side of the leather on the outer side and forming the outer surface of the glove, said outer leather ply having stitched seams, a rubber latex layer internally of said outer ply and adhesively united to the inner unfinished rough flesh side of the leather, said rubber latex layer extending as a unitary seal across the stitched seams of said outer leather ply and covering both faces of the stitched seams and the stitching at said seams being anchored in said inner rubber latex layer whereby the seams and stitching holes in the outer leather ply are completely covered and sealed against the entrance of moisture and the stitching is held internally of the leather ply against opening along said seams in the event of breaking of said stitching, and a fabric lining internally of said inner rubber latex layer.

3. A glove of the class described comprising an outer leather ply having an inturned stitched seam and a rubber latex layer internally of said outer ply and adhesively united to the inner surface thereof, said inner rubber latex layer covering both faces of said inturned stitched seam.

4. A glove of the class described, comprising an outer leather ply having an inturned stitched seam, an inner ply forming a lining and having an outturned stitched seam, and a rubber latex layer adhesively united to the surface of one of said plies and disposed between the adjacent surfaces of said plies, said rubber latex layer covering both faces of the stitched seam of the ply to which the rubber latex layer is applied.

JOHN BURNHAM.